(12) United States Patent
Haag et al.

(10) Patent No.: US 11,812,287 B2
(45) Date of Patent: Nov. 7, 2023

(54) BROADBAND ACCESS FOR 5G CAPABLE RESIDENTIAL GATEWAYS

(71) Applicant: Deutsche Telekom AG, Bonn (DE)

(72) Inventors: Thomas Haag, Rodgau (DE); Werner Weiershausen, Eppertshausen (DE); Hans-Joerg Kolbe, Darmstadt (DE); Egbert Terlinde, Darmstadt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 78 days.

(21) Appl. No.: 17/788,801

(22) PCT Filed: Mar. 2, 2021

(86) PCT No.: PCT/EP2021/055211
§ 371 (c)(1),
(2) Date: Jun. 24, 2022

(87) PCT Pub. No.: WO2021/190880
PCT Pub. Date: Sep. 30, 2021

(65) Prior Publication Data
US 2023/0030887 A1 Feb. 2, 2023

(30) Foreign Application Priority Data

Mar. 24, 2020 (EP) ..................................... 20165229

(51) Int. Cl.
*H04W 24/02* (2009.01)
*H04W 88/16* (2009.01)

(52) U.S. Cl.
CPC ................. *H04W 24/02* (2013.01); *H04W 88/16* (2013.01)

(58) Field of Classification Search
None
See application file for complete search history.

(56) References Cited

FOREIGN PATENT DOCUMENTS

| WO | 2018/229059 A1 | 12/2018 |
| WO | 2020/055309 A1 | 3/2020 |

OTHER PUBLICATIONS

BROADBAND FORUM: "REVISION 3 contrib-20838 SD-420 R3 5G Fixed Mobile Convergence Study", 3GPP DRAFT; SD-420R3, 3RD GENERATION PARTNERSHIP PROJECT (3GPP), MOBILE COMPETENCE CENTRE; 650, ROUTE DES LUCIOLES; F-06921 SOPHIA-ANTIPOLIS CEDEX; FRANCE, Jan. 18, 2019, XP051611311, Retrieved from the Internet: URL: http://www.3gpp.org/ftp/tsg%5Fsa/WG3%5FSecurity/TSGS3%5F94%5FKochi/Docs/S3%2D190029%2Ezip [retrieved on Jan. 18, 2019].

(Continued)

*Primary Examiner* — Faruk Hamza
*Assistant Examiner* — Cassandra L Decker
(74) *Attorney, Agent, or Firm* — LEYDIG, VOIT & MAYER, LTD.

(57) ABSTRACT

A method for an improved and simplified operation and architecture of a broadband access network of a telecommunications network and/or for providing fixed mobile convergence (FMC) and/or fixed mobile interworking (FMI) access and functionality to a plurality of residential gateways being connected to the broadband access network includes: in a first step, a unique identifier information is transmitted, by the specific residential gateway, to the broadband access network; in a second step, the unique identifier information is used, by the broadband access network, to decide whether or not the broadband access network is able or configured to provide 5G network access to the specific residential gateway and/or whether the specific residential gateway is able or configured to receive or to accept or to process 5G network access; and in a third step, the FMC access gateway function node or instance is dynamically configured or generated.

8 Claims, 5 Drawing Sheets

(56) References Cited

OTHER PUBLICATIONS

BROADBAND FORUM: "WT-456 AGF Functional Requirements", 3GPP DRAFT; R3-200300, 3RD GENERATION PARTNERSHIP PROJECT (3GPP), MOBILE COMPETENCE CENTRE; 650, ROUTE DES LUCIOLES; F-06921 SOPHIA-ANTIPOLIS CEDEX; FRANCE, Feb. 12, 2020, XP051853869, Retrieved from the Internet: URL: https://ftp.3gpp.org/tsgran/WG3-lu/TSGR3107_e/Docs/R3-200300.zip-WT-456AGFFunctionalRequirements-StrawBallotTssue-01.doc [retrieved on Feb. 12, 2020].

BROADBAND FORUM: "WT-470 5G FMC Architecture", 3GPP Draft; R3-200300, 3RD GENERATION PARTNERSHIP PROJECT (3GPP), MOBILE COMPETENCE CENTRE; 650, ROUTE DES LUCIOLES; F-06921 SOPHIA-ANTIPOLIS CEDEX; FRANCE, Feb. 12, 2020, XP051853870, Retrieved from the Internet: URL: https://ftp.3gpp.org/tsgran/WG3_lu/TSGR3107 e/Docs/R3-200300.zipWT-470_5G_FMC_Architecture_Straw Ballot_Issue_01.doc [retrieved on Feb. 12, 2020].

HUAWEI: "5G-RG registration procedure", 3GPP DRAFT; S2-181919 5WWC 5G-RG REGISTRATION PROCEDURE, 3RD GENERATION PARTNERSHIP PROJECT (3GPP), MOBILE COMPETENCE CENTRE; 650, ROUTE DES LUCIOLES ; F-06921 SOPHIA-ANTIPLOS CEDEX; FRANCE, vol. SA WG2, No. Montreal, Canada; 20180226 - 20180302, Feb. 19, 2018, XP051408172, Retrieved from the Internet: URL: http://www.3gpp.org/ftp/tsg%5Fsa/WG2%5FArch/TSGS2%5F126%5FMontreal/Docs/ [retrieved on Feb. 19, 2018].

US 11,812,287 B2

BROADBAND ACCESS FOR 5G CAPABLE RESIDENTIAL GATEWAYS

CROSS-REFERENCE TO PRIOR APPLICATIONS

This application is a U.S. National Phase application under 35 U.S.C. § 371 of International Application No. PCT/EP2021/055211, filed on Mar. 2, 2021, and claims benefit to European Patent Application No. EP 20165229.4, filed on Mar. 24, 2020. The International Application was published in English on Sep. 30, 2021 as WO 2021/190880 A1 under PCT Article 21(2).

FIELD

The present invention relates a method for an improved and simplified operation and architecture of a broadband access network, especially comprising a central office point of delivery, of a telecommunications network and/or for providing fixed mobile convergence (FMC) and/or fixed mobile interworking (FMI) access and functionality to a plurality of residential gateways being connected to the broadband access network, especially via the central office point of delivery, wherein the broadband access network, especially the central office point of delivery, comprises an FMC access gateway function node or instance, especially a 5G access gateway function node or instance.

Furthermore, the present invention relates to a telecommunications network and a system for an improved and simplified operation and architecture of a broadband access network, especially comprising a central office point of delivery, of a telecommunications network and/or for providing fixed mobile convergence (FMC) and/or fixed mobile interworking (FMI) access and functionality to a plurality of residential gateways being connected to the broadband access network, especially via the central office point of delivery, wherein the broadband access network, especially the central office point of delivery, comprises an FMC access gateway function node or instance, especially a 5G access gateway function node or instance.

Furthermore, the present invention relates to an FMC access gateway function node or instance of a central office point of delivery of a telecommunications network or of a system.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

The present application generally relates to the area of aggregation networks linking remote or central access nodes to a backbone network or core network of the telecommunications network, e.g. broadband access network platforms such as 5G or CORD (Central Office Re-architected as a Data Center).

Different technical worlds have to be combined for the realization of convergent service production based on access networks from fixed network production and mobile communications (Fixed Mobile Convergence (FMC) and/or fixed mobile interworking (FMI)). If a wireline access network (or broadband access network), especially a central office point of delivery, has to process messages from both worlds, it must basically be able to distinguish between fixed and mobile messages (i.e. messages relating to or emanating from a fixed line network or its components vs. messages relating to or emanating from a mobile network or its components). A detailed or in-depth implementation of the respective control interfaces and processes requires a high processing effort within the broadband access network or central office point of delivery.

SUMMARY

In an exemplary embodiment, the present invention provides a method for an improved and simplified operation and architecture of a broadband access network, especially comprising a central office point of delivery, of a telecommunications network and/or for providing fixed mobile convergence (FMC) and/or fixed mobile interworking (FMI) access and functionality to a plurality of residential gateways being connected to the broadband access network, especially via the central office point of delivery. The broadband access network, especially the central office point of delivery comprises an FMC access gateway function node or instance, especially a 5G access gateway function node or instance. The central office point of delivery and/or the broadband access network comprises a plurality of line termination nodes. A specific residential gateway of the plurality of residential gateways is connectable — directly or indirectly — to a specific line termination node of the plurality of line termination nodes, using an access node port of the specific line termination node. Upon activation of the specific residential gateway being connected to the specific line termination node, the FMC access and functionality is set up or provided to the specific residential gateway via the following steps: in a first step, a unique identifier information is transmitted, by the specific residential gateway and especially as part of a port notification message, to the broadband access network and/or to the central office point of delivery, especially to the specific line termination node, in a second step, subsequent to the first step, the unique identifier information transmitted by the specific residential gateway is used, by the broadband access network and/or by the central office point of delivery, to decide whether or not the broadband access network is able or configured to provide 5G network access to the specific residential gateway, especially at the location of the specific residential gateway, and/or whether the specific residential gateway is able or configured to receive or to accept or to process 5G network access, especially in case the broadband access network is able or configured to provide 5G network access, and in a third step, subsequent to the second step, the FMC access gateway function node or instance is dynamically configured or generated in order to provide network access to the specific residential gateway according to both the configuration or ability of the specific residential gateway, and the configuration or ability of the broadband access network, especially at the location of the specific residential gateway. The central office point of delivery and/or the broadband access network comprises an FMC proxy node or instance, especially as part of the FMC access gateway function node or instance. The FMC proxy node or instance detects — especially as part of the second step, and especially by means of or based on the unique identifier information transmitted by the specific residential gateway — which protocols and procedures shall be used with respect to the specific residential gateway, and determines — especially as part of the third step, and especially by means of selecting one FMC access gateway function module out of a plurality of different FMC access gateway function modules, as well as by means of selecting a corresponding FMC access gateway function data module or feature block — how access-related messages shall be processed.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
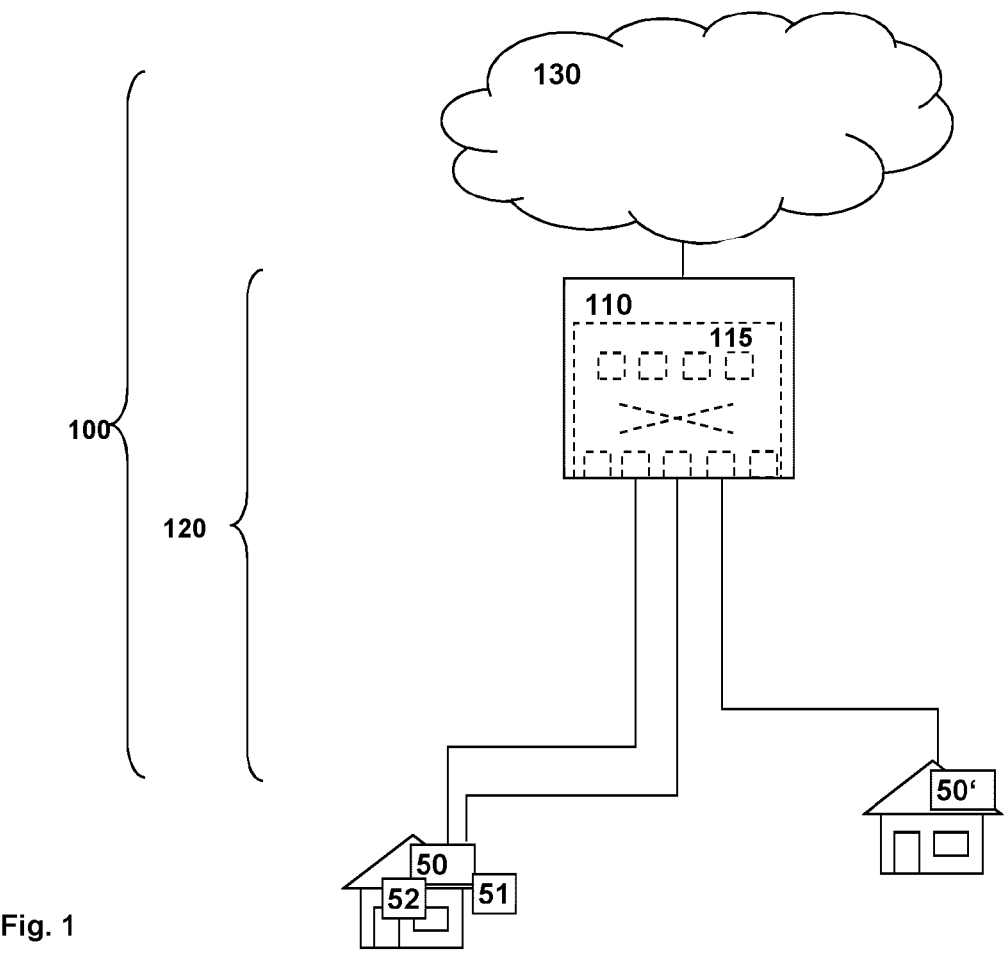
FIG. 1 schematically illustrates a telecommunications network according to the present invention, having a broadband access network with a central office point of delivery.

Exemplary embodiments of the present invention provide a technically simple, effective and cost effective solution for an improved and simplified operation and architecture of a broadband access network, especially comprising a central office point of delivery, of a telecommunications network and/or for providing fixed mobile convergence (FMC) and/or fixed mobile interworking (FMI) access and functionality to a plurality of residential gateways being connected to the broadband access network, especially via the central office point of delivery. Exemplary embodiments of the present invention further provide a corresponding telecommunications network, a corresponding system, a corresponding central office point of delivery, and a corresponding FMC access gateway function node or instance.

In an exemplary embodiment, the present invention provides a method for an improved and simplified operation and architecture of a broadband access network, especially comprising a central office point of delivery, of a telecommunications network and/or for providing fixed mobile convergence (FMC) and/or fixed mobile interworking (FMI) access and functionality to a plurality of residential gateways being connected to the broadband access network, especially via the central office point of delivery, wherein the broadband access network, especially the central office point of delivery, comprises an FMC access gateway function node or instance, especially a 5G access gateway function node or instance, wherein the central office point of delivery and/or the broadband access network comprises a plurality of line termination nodes, wherein a specific residential gateway of the plurality of residential gateways is connectable — directly or indirectly — to a specific line termination node of the plurality of line termination nodes, using an access node port of the specific line termination node, wherein — upon activation of the specific residential gateway being connected to the specific line termination node — the FMC access and functionality is set up or provided to the specific residential gateway via the following steps:

in a first step, a unique identifier information is transmitted, by the specific residential gateway and especially as part of a port notification message, to the broadband access network and/or to the central office point of delivery, especially to the specific line termination node, in a second step, subsequent to the first step, the unique identifier information transmitted by the specific residential gateway is used, by the broadband access network and/or by the central office point of delivery, to decide whether or not the broadband access network is able or configured to provide 5G network access to the specific residential gateway, especially at the location of the specific residential gateway, and/or whether the specific residential gateway is able or configured to receive or to accept or to process 5G network access, especially in case the broadband access network is able or configured to provide 5G network access, in a third step, subsequent to the second step, the FMC access gateway function node or instance is dynamically configured or generated in order to provide network access to the specific residential gateway according to both the configuration or ability of the specific residential gateway, and the configuration or ability of the broadband access network, especially at the location of the specific residential gateway.

It is thereby advantageously possible according to the present invention to provide a solution for an FMC access gateway function node or instance (i.e. to support residential gateways that include 5G non-access stratum (NAS) signaling (5G-RG) and residential gateways that are purely wireline (fixed network residential gateways)) that can be realized in a straightforward manner. In case that the residential gateway is connected to the broadband access network in a 5G-enabled manner (i.e. the broadband network is able or configured to provide 5G network access at the location of the residential gateway), the 5G core (network) is able to deliver on mobility service but also acting as the backbone infrastructure for services typically delivered via a wireline network. The FMC access gateway function provides for control plane (CP) and user plane (UP) separation, and differs from a classical BNG (broadband network gateway) in that the signalling towards the core network for AAA are those defined within 5G specifications (typically the authentication server function, AUSF providing the common server functionality). According to the present invention, a novel method is described in which an aggregation element is provided for FMC (FMC access gateway function node or instance) on the basis of previously determined connection-specific characteristics. This enables targeted processing of the connection-specific messages, as well as the use of ready-made control messages. The procedure supports the economical use of processing and switching resources.

If a fixed network (FN) is currently to be used instead of a radio access network (RAN) for data feed to a mobile radio core (network), e.g. 5G core (5GC), an aggregation or interworking function (e.g. N3IWF, FMIF or AGF) must be implemented between the different networks. This aggregation function mediates the respective data and messages as a link between the two network types. This is necessary because the protocols and processes of the two networks are different. For this purpose, an aggregation function must be able to handle the protocol stacks and processes of both networks. These protocol stacks include the protocols for controlling the Layer 1-3 data connections of the fixed network and the data transmission sessions on the fixed network side as well as the mobile radio network-based NAS (Non Access Stratum) messages (also "N-Messages") for setting up the communication for the PDU session-based data transmissions. The exchange of N-Messages allows to determine and influence the state of the connection (bearer) between the mobile radio endpoint (user equipment, UE) and 5GC. When a user equipment connects to the mobile radio core, N-messages are exchanged between the user equipment and the core network for connection and session control. If the user equipment has no mobile radio capabilities, these tasks are performed by a Remote Gateway (RG).

According to the present invention, a method is provided by which an aggregation point (or FMC access gateway function node or instance, especially as part of a central office point of delivery) is set up with (or comprising) a module adapted to the respective access (mode - used by the residential gateway) and the 5G core.

For fixed mobile convergence and/or fixed mobile interworking, the invention enables the compilation of N-messages based on information obtained in advance. The basis for this is the FMC access gateway function node or instance, corresponding to (or being) an aggregation module in the access point (or central office point of delivery), which has knowledge of both the general conditions of the end point from which the access is made (i.e. especially the user equipment, or the residential gateway), and the services permitted and booked for the 5G core access. Furthermore, the states of the fixed network are known and the properties of the paths between both the aggregation module (FMC access gateway function node or instance) and either the user equipment or 5G residential gateway (both 5G enabled) or the user equipment or fixed network residential gateway (both not 5G enabled), on the one hand, and the aggregation module (FMC access gateway function node or instance) and the mobile radio core (5G core). Especially according to the present invention, instead of a detailed evaluation of the respective control messages, due to the knowledge of the two-sided network states in the aggregation module (FMC access gateway function node or instance), especially equipment-specific sequences are able to be shortened via preconfigured message parts or sequences.

According to the present invention, in view of an improved and simplified manner of providing FMC access and functionality to a plurality of residential gateways being connected — to the broadband access network, especially via the central office point of delivery — typically via a plurality of line termination nodes, a specific residential gateway of the plurality of residential gateways is connected — directly or indirectly — to a specific line termination node (typically using an access node port of the specific line termination node), wherein upon activation of the specific residential gateway being connected to the specific line termination node, the FMC access and functionality is set up or provided to the specific residential gateway via the following steps:

in a first step, a unique identifier information is transmitted, by the specific residential gateway and especially as part of a port notification message, to the broadband access network and/or to the central office point of delivery, especially to the specific line termination node, in a second step, subsequent to the first step, the unique identifier information transmitted by the specific residential gateway is used, by the broadband access network and/or by the central office point of delivery, to decide whether or not the broadband access network is able or configured to provide 5G network access to the specific residential gateway, especially at the location of the specific residential gateway, (i.e., essentially, whether the access line, provided by the broadband access network, is 5G enabled or not) and/or whether the specific residential gateway is able or configured to receive or to accept or to process 5G network access, especially in case the broadband access network is able or configured to provide 5G network access, in a third step, subsequent to the second step, the FMC access gateway function node or instance is dynamically configured or generated in order to provide network access to the specific residential gateway according to both the configuration or ability of the specific residential gateway, and the configuration or ability of the broadband access network, especially at the location of the specific residential gateway.

The telecommunications network according to the present invention might be a fixed-line telecommunications network or a mobile communication network but preferably is a telecommunications network having both aspects (or parts) of a fixed-line telecommunications network (or being a fixed-line telecommunications network in such parts) and aspects (or parts) of a mobile communication network (or being a mobile communication network in such parts) — fixed-mobile-convergence networks.

According to the present invention, it is advantageously possible and preferred according to the present invention that the central office point of delivery and/or the broadband access network comprises or is assigned to or is able to access a controller node, and at least one repository node, wherein the controller node and/or the at least one repository node or its database content is or are involved in the decision of the second step, wherein especially the second step involves a first look up operation in order to determine or to decide whether or not the broadband access network is able or configured to provide 5G network access to the specific residential gateway, especially at the location of the specific residential gateway, and/or wherein the second step involves a second look up operation in order to determine or to decide whether the specific residential gateway is able or configured to receive or to accept or to process 5G network access.

Thereby, it is advantageously possible to easily and effectively implement a method according to the present invention.

Furthermore, it is advantageously possible and preferred according to the present invention that the central office point of delivery and/or the broadband access network comprises an FMC proxy node or instance, especially as part of the FMC access gateway function node or instance, wherein the FMC proxy node or instance detects — especially as part of the second step, and especially via or based on the unique identifier information transmitted by the specific residential gateway — which protocols and procedures shall be used with respect to the specific residential gateway, and determines — especially as part of the third step, and especially via selecting one FMC access gateway function module out of a plurality of different FMC access gateway function modules, as well as via selecting a corresponding FMC access gateway function data module or feature block — how access-related messages shall be processed.

Thereby, it is advantageously possible to easily and effectively realize a method of an improved and simplified operation and architecture of a broadband access network, especially for providing fixed mobile convergence and/or fixed mobile interworking access and functionality to a plurality of residential gateways being connected to the broadband access network.

According to a further embodiment of the present invention, the central office point of delivery and/or the broadband access network comprises or is assigned to a 5G core network, wherein — subsequent to selecting the FMC access gateway function module and the corresponding FMC access gateway function data module or feature block — a block-based processing is realized, on the one hand, between the specific residential gateway and the central office point of delivery, and, on the other hand, the central office point of delivery and the 5G core network.

Via realizing a block-based processing between, on the one hand, the specific residential gateway and the central office point of delivery, and, on the other hand, the central office point of delivery and the 5G core network, it is advantageously possible according to the present invention to enable targeted processing of connection-specific messages, as well as the use of ready-made control messages such that an economical use of processing and switching resources can be made. Especially, a method according to the present invention allows for the compilation of N-messages based on information obtained in advance, i.e. based on knowledge of both the general conditions of the end point (user equipment/residential gateway, from which the access is made) and the services permitted and booked for the 5G core access. Hence, instead of a detailed evaluation of the respective control messages, due to the knowledge of the two-sided network states in the FMC access gateway function node or instance, especially equipment-specific sequences can be shortened via preconfigured message parts or sequences.

According to still a further embodiment of the present invention, especially as part of the second step and especially after an initial access verification, a token information is transmitted, by the broadband access network and/or by the central office point of delivery, to the specific residential gateway, wherein the token information especially corresponds to a central token information being known to different network nodes or instances of the broadband access network and/or the central office point of delivery and is used as an identifier during subsequent steps or processes.

Via using a token information, it is advantageously possible and preferred according to the present invention, that the method enables an uninterrupted transition to a customized module (especially as part of the FMC access gateway function node or instance) if basic conditions change. Especially, this procedure is supported by the optional exchange of a token (information) between the access function (or gate function or functionality) and the residential gateway that wants to establish a connection.

According to a further embodiment of the present invention, — subsequent to completing the registration procedure of the specific residential gateway — a protocol data unit (PDU) session is established by performing a further block-based processing, on the one hand, between the specific residential gateway and the central office point of delivery, and, on the other hand, the central office point of delivery and the 5G core.

Thereby, it is advantageously possible to easily and effectively implement a method according to the present invention.

Furthermore, the present invention relates to a telecommunications network for an improved and simplified operation and architecture of a broadband access network, especially comprising a central office point of delivery, of a telecommunications network and/or for providing fixed mobile convergence (FMC) and/or fixed mobile interworking (FMI) access and functionality to a plurality of residential gateways being connected to the broadband access network, especially via the central office point of delivery, wherein the broadband access network, especially the central office point of delivery, comprises an FMC access gateway function node or instance, especially a 5G access gateway function node or instance, wherein the central office point of delivery and/or the broadband access network comprises a plurality of line termination nodes, wherein a specific residential gateway of the plurality of residential gateways is connectable — directly or indirectly — to a specific line termination node of the plurality of line termination nodes, using an access node port of the specific line termination node, wherein — upon activation of the specific residential gateway being connected to the specific line termination node — the FMC access and functionality is set up or provided to the specific residential gateway and the telecommunications network is configured such that:

a unique identifier information is received, by the broadband access network and/or to the central office point of delivery, especially the specific line termination node, from the specific residential gateway and especially as part of a port notification message, the unique identifier information received from the specific residential gateway is used, by the broadband access network and/or by the central office point of delivery, to decide whether or not the broadband access network is able or configured to provide 5G network access to the specific residential gateway, especially at the location of the specific residential gateway, and/or whether the specific residential gateway is able or configured to receive or to accept or to process 5G network access, especially in case the broadband access network is able or configured to provide 5G network access, the FMC access gateway function node or instance is dynamically configured or generated in order to provide network access to the specific residential gateway according to both the configuration or ability of the specific residential gateway, and the configuration or ability of the broadband access network, especially at the location of the specific residential gateway.

Furthermore, the present invention relates to a system for an improved and simplified operation and architecture of a broadband access network, especially comprising a central office point of delivery, of a telecommunications network and/or for providing fixed mobile convergence (FMC) and/or fixed mobile interworking (FMI) access and functionality to a plurality of residential gateways being connected to the broadband access network, especially via the central office point of delivery,
  wherein the broadband access network, especially the central office point of delivery, comprises an FMC access gateway function node or instance, especially a 5G access gateway function node or instance,
  wherein the central office point of delivery and/or the broadband access network comprises a plurality of line termination nodes, wherein a specific residential gateway of the plurality of residential gateways is connectable — directly or indirectly — to a specific line termination node of the plurality of line termination nodes, using an access node port of the specific line termination node,
  wherein — upon activation of the specific residential gateway being connected to the specific line termination node — the FMC access and functionality is set up or provided to the specific residential gateway and the system is configured such that:
    a unique identifier information is received, by the broadband access network and/or to the central office point of delivery, especially the specific line termination node, from the specific residential gateway and especially as part of a port notification message,
    the unique identifier information received from the specific residential gateway is used, by the broadband access network and/or by the central office point of delivery, to decide
    whether or not the broadband access network is able or configured to provide 5G network access to the specific residential gateway, especially at the location of the specific residential gateway, and/or
    whether the specific residential gateway is able or configured to receive or to accept or to process 5G network access, especially in case the broadband access network is able or configured to provide 5G network access,
    the FMC access gateway function node or instance is dynamically configured or generated in order to provide network access to the specific residential gateway according to both the configuration or ability of the specific residential gateway, and the configuration or ability of the broadband access network, especially at the location of the specific residential gateway.

Additionally, the present invention relates to an FMC access gateway function node or instance of a central office point of delivery of a telecommunications network or of a system and/or to the use of an FMC access gateway function node or instance of a central office point of delivery in a telecommunications network or in a system or in a method.

Still additionally, the present invention relates to a program comprising a computer readable program code which, when executed on a computer and/or on a central office point of delivery and/or on a FMC access gateway function node or instance of a central office point of delivery, or in part on a central office point of delivery and/or in part on a FMC access gateway function node or instance of the central office point of delivery, causes the computer and/or the central office point of delivery and/or the FMC access gateway function node or instance of the central office point of delivery to perform a method according to the present invention.

Furthermore, the present invention relates to a computer program product for an improved and simplified operation and architecture of a broadband access network, especially comprising a central office point of delivery, of a telecommunications network and/or for providing fixed mobile convergence (FMC) and/or fixed mobile interworking (FMI) access and functionality to a plurality of residential gateways being connected to the broadband access network, the computer program product comprising a computer program stored on a storage medium, the computer program comprising program code which, when executed on a computer and/or on a central office point of delivery and/or on a FMC access gateway function node or instance of a central office point of delivery, or in part on a central office point of delivery and/or in part on a FMC access gateway function node or instance of the central office point of delivery, causes the computer and/or the central office point of delivery and/or the FMC access gateway function node or instance of the central office point of delivery to perform a method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a telecommunications network 100 according to the present invention is schematically shown, having a fixed line (broadband) access network 120, and a core network 130. According to the present invention, the core network 130 also comprises a 5G core (network), hereinafter also designated by reference sign 105, cf. FIG. 2. A mobile (or cellular) access network might be present as well, as part of the telecommunications network 100. User equipments or client devices 51, 52 are connected to the telecommunications network 100 via the fixed line (broadband) access network 120. The telecommunications network 100 comprises, especially as part of the broadband access network 120, at least one logical or physical central office point of delivery 110 that is preferably realized within a data center and that is especially handling different access requirements, especially different access possibilities, of the client devices 51, 52 to network functionalities provided by the telecommunications network 100 or via the telecommunications network 100. The client devices 51, 52 are typically connected to the logical or physical central office point of delivery 110 via a residential gateway 50, 50' (also called customer premises equipment 50, 50') or via a residential gateway functionality or customer premises equipment functionality that might be built in (or realized within) the client devices 51, 52. Typically, a plurality of residential gateways 50, 50' are connected to the broadband access network 120, only two of which are represented in FIG. 1. Preferably but not necessarily, the central office point of delivery 110 comprises a switching fabric 115 comprising a plurality of spine network nodes and typically also a plurality of leaf network nodes.

Figure 2:
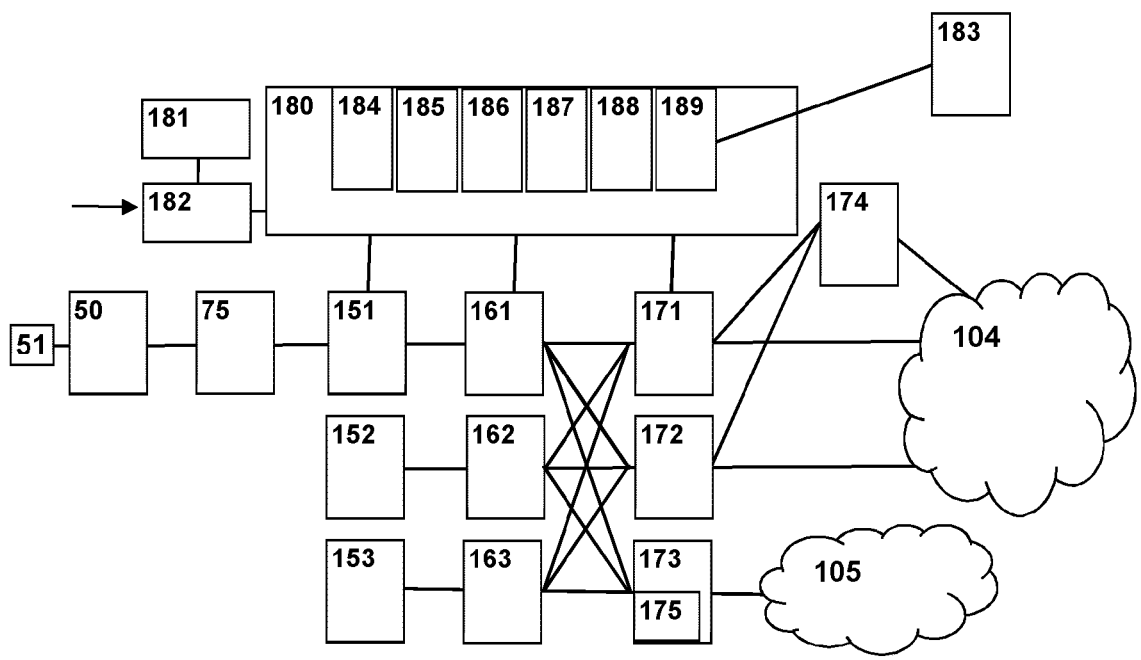
FIG. 2 schematically illustrates a part of a broadband access network of a telecommunications network with a central office point of delivery, a plurality of line termination nodes as well as an FMC access gateway function node or instance.

FIG. 2 schematically illustrates a central office point of delivery 110 as part of a broadband access network 120 of a telecommunications network 100, wherein the represented part of the telecommunications network 100 comprises — besides a controller node 180 and at least one repository node 182 — a plurality of line termination nodes 151, 152, 153. Typically, each of the line termination nodes 151, 152, 153 has one or a plurality of access node ports. In the example represented in FIG. 2, the broadband access network 120 comprises three line termination nodes, a first line termination node 151, a second line termination node 152, and a third line termination node 153. The line termination nodes 151, 152, 153 might be provided to support different access technologies to a residential gateway 50, 50' (or home gateway or customer premises equipment). In the exemplary embodiment shown in FIG. 2, the first line termination node 151 is taken as the line termination node connected to the residential gateway 50. In such a situation, a client device 51 is connected to the telecommunications network 100 (i.e. to the first (or also called specific) line termination node 151) via the residential gateway 50 (or customer premises equipment 50 or home gateway device 50), and, according to the exemplary embodiment shown in FIG. 2, also a network termination node 75. The functionality of the residential gateway 50 and the functionality of the network termination node 75 might also be integrated in one device or "box". Even the functionality of the client device 51, the functionality of the residential gateway 50 and the functionality of the network termination node 75 might be integrated in one device or "box". Nevertheless, these functionalities are represented in FIG. 2 as separated functionalities. In FIG. 2, only one residential gateway device 50 (i.e. a specific residential gateway), and only one client device 51 (as well as only one network termination node 75, i.e. a specific network termination node) are shown. However, also the second and/or third line termination nodes 152, 153 might be connected to corresponding network termination nodes and residential gateways.

In the context of the present invention, in order to separate the "specific" or considered entities from the other entities of the same kind within the broadband access network 120, the first line termination node 151 is also called the specific line termination node 151, the network termination node 75 connected to the first line termination node 151 is also called the specific network termination node 75, and the residential gateway 50 connected to the specific network termination node 75 is also called the specific residential gateway.

In case of the line termination nodes 151, 152, 153 having a plurality of access node ports, also a plurality of network termination nodes are able to be connected to one line termination node 151, 152, 153 and/or (in case that a network termination node has a plurality of ports) also a plurality of residential gateways are able to be connected to one network termination node.

According to the present invention, a method for an improved and simplified operation and architecture of a broadband access network, especially comprising a central office point of delivery, of a telecommunications network and/or for providing fixed mobile convergence and/or fixed mobile interworking access and functionality to a plurality of residential gateways being connected to the broadband access network is provided. Especially, this serves to establish the FMC access and functionality such that 5G enabled residential gateway devices are able to be served, and non-5G enabled residential gateway devices are nevertheless able to be connected, or to communicate with the 5G core (network).

The central office point of delivery 110 and/or the broadband access network 120 comprises — besides the controller node 180, the at least one repository node 182, and the plurality of line termination nodes 151, 152, 153 — a plurality of service edge nodes 171, 172, 173, 174.

According to the present invention, upon activation of the specific residential gateway 50 being connected (directly or via the specific network termination node 75) to the specific line termination node 151 — the FMC access and functionality is set up or provided to the specific residential gateway 50 via the following steps:

in a first step, a unique identifier information is transmitted, by the specific residential gateway 50 and especially as part of a port notification message 55 (cf. FIG. 3), to the broadband access network 120 and/or to the central office point of delivery 110, especially to the specific line termination node 151, in a second step, subsequent to the first step, the unique identifier information transmitted by the specific residential gateway 50 is used, by the broadband access network 120 and/or by the central office point of delivery 110, to decide whether or not the broadband access network 120 is able or configured to provide 5G network access to the specific residential gateway 50, especially at the location of the specific residential gateway 50 (i.e. whether the broadband access network 120 is able (or enabled) to provide 5G access to the specific residential gateway 50), and/or whether the specific residential gateway 50 is able or configured to receive or to accept or to process 5G network access, especially in case the broadband access network is able or configured to provide 5G network access, in a third step, subsequent to the second step, the FMC access gateway function node or instance 175 is dynamically configured or generated in order to provide network access (i.e. the requested network access) to the specific residential gateway 50 according to both the configuration or ability of the specific residential gateway 50, and the configuration or ability of the broadband access network 120, especially at the location of the specific residential gateway 50.

Hence, FIG. 2 schematically shows a typical setup of a central office point of delivery 110. The specific residential gateway 50 (or specific home gateway 50) is connected via the specific network termination node 75 (e.g. an optical network terminal) and the specific line termination node 151 (e.g. an optical line terminal, OLT MAC) to a leaf switch 161 (of a plurality of leaf switches 161, 162, 163) which is dual-homed at a plurality of spine switches 171, 172, 173. In the exemplary embodiment shown in FIG. 2, it is assumed that the plurality of spine switches 171, 172, 173 also have a functionality of a service edge or a service edge user plane function or functionality. However, the spine switch functionality might also be separated from the service edge functionality and vice versa, i.e. the service edge function or functionality may as well reside inside a different node in the central office point of delivery (than the spine switch functionality), e.g. a leaf switch node 161, 162, 163. A fourth service edge node 174, used for a bit stream access (BSA-SE-U) is assumed to be the layer-2 handoff for Layer-2 bitstream access which does not require IP routing capabilities. The controller or controller node 180 for the access domain — which controls the central office point of delivery 110 — has an access domain repository or repository node 182 (so-called A4 repository) which holds all devices within the passive optical network, including the connected optical network terminal devices (network termination nodes) and/or home gateways 50.

A service edge control plane 188 (or service edge control plane node 188) is shown as residing in the controller node 180, however, according to the present invention, it is also possible that the service edge control plane 188 (or service edge control plane node 188) is located separately from the controller node 180.

Besides the repository node 182, a database for alarms and anomalies is shown. This holds the history even in case of that the A4 repository (or repository node 182) already lost the session context (of a connection session) due to session termination.

At the controller node 180, typically applications or functionalities like an ONT authentication application or functionality 184, and/or a vOLTHA functionality 185 and/or a fabric agent (FN-C) functionality 185 are located that control the configuration and management of related devices.

For communication towards a policy server RP (Radius Proxy), a PFS client or PFS client functionality 189 takes care. A PFS functionality or PFS node 183 corresponds to a platform control which is or corresponds to an AAA (authentication, authorization, and accounting) and Policy Control Server. This platform device receives session initiation requests usually by BNGs which is part of the communication of the central office point of delivery 110. Furthermore, the PFS node 183 is the policy controller providing access profile settings based on policies rules and decisions. This information is sent to central office point of delivery 110 in order to configure at the service edge nodes 171, 172, 173, 174 (SE-U) service related parameters.

For users and services based on PPPoE (point-to-point-protocol over Ethernet), user name and password and optionally Line ID will be taken for authentication. For users and services without user session identification the pre-configuration of the optical network terminal serial number (i.e. the identity information of the network termination node) is needed. This is done by a B2B interface, shown via an arrow on the left hand side of FIG. 2. In that case, the wholesale or business partner provides a serial number information which is stored in the A4 repository, i.e. the repository node 182. If an optical network terminal (or network termination node) (GK/L2BSA) comes up (i.e. is activated), its serial number will be authenticated against the preconfigured value and policies are set accordingly.

According to the present invention, and in case that the specific residential gateway 50 is connected and activated, the FMC access and functionality is set up or provided to the specific residential gateway 50 involving the FMC access gateway function node or instance 175, schematically located as part of one of the service edge nodes 171, 172, 173 being connected to the 5G core (network) 105; however, the FMC access gateway function node or instance 175 could also be realized as part of another network node of the central office point of delivery 110.

Figure 3:
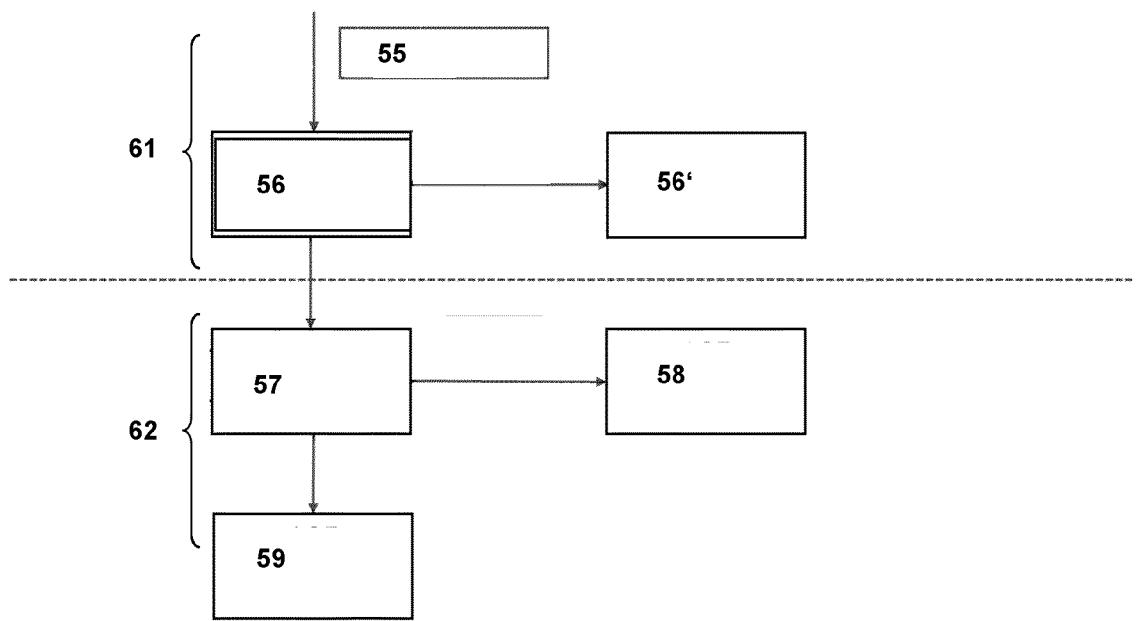
FIG. 3 schematically illustrates an example of a decision logic according to the present invention relating to decisions taken after starting up a residential gateway being connected to the broadband access network.

FIG. 3 schematically illustrates an example of a decision logic according to the present invention relating to decisions taken after starting up the specific residential gateway 50 being connected to the broadband access network 120. The residential gateway 50 is connected to the specific line termination node 151 via a fixed line access, i.e. via an access line provided by the broadband access network 120, and activated (or initially started); a port notification message 55 is sent (by the residential gateway 50) to the broadband access network 120, especially to the specific line termination node 151. A first look up operation 61 is performed, by a network node of the access network 120, especially involving the repository node 182, in order to determine, at a processing step 56 and especially based on the port information, whether the access line is a 5G enabled access line or a (legacy) fixed line access line (i.e. to determine the access platform, whether or not the broadband access network is able or configured to provide 5G network access to the specific residential gateway 50, especially at the location of the specific residential gateway 50). If the access line is not 5G enabled, a legacy retail or wholesale functionality 56' is assumed. In case that the access line is 5G enabled, a second step or second look up operation 62 is performed, by a network node of the access network 120, especially the FMC access gateway function node or instance 175, in order to determine, at a processing step 57 whether the residential gateway 50 is a 5G enabled residential gateway or a fixed network residential gateway 50. If the residential gateway 50 is not 5G enabled, a first mode 58 of the FMC access gateway function node or instance 175 is initiated; otherwise, a second mode 59 of the FMC access gateway function node or instance 175 is initiated. The second look up operation 62 involves a dynamic decision (in the FMC access gateway function node or instance 175), i.e. an access module for FMC decides which protocols and which procedure (e.g. Proxymode /PPPoE-NAS Proxy (in case the residential gateway 50 is not 5G enabled) or Relaymode/NAS-Relay (in case the residential gateway 50 is 5G enabled)) is used. Both procedures or modes described here are only examples that can have further variants or sub-variants. However, according to the present invention, it is advantageously possible to provided for a dynamic control of the access and the platform access.

Figure 4:
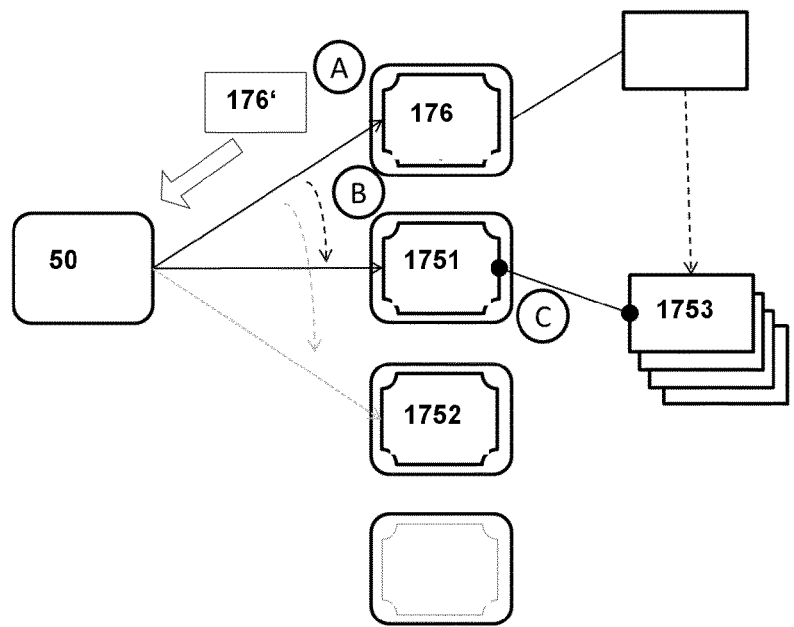
FIGS. 4 and 6 schematically illustrate examples of further steps according to the present invention performed after connecting and starting up the residential gateway.

In FIG. 4, an example of further steps according to the present invention, performed after connecting and starting up the residential gateway 50, is shown, during which a module for FMC traffic is set up. The broadband access network 120 (or the central office point of delivery 110) comprises a detection function (cf. A, FMC proxy node or instance 176) to distinguish FMC traffic. Typical access characteristics serve as a distinguishing feature. These characteristics are agreed upon as part of the messages (e.g. service field) or recorded during the setup process of the residential gateway 50 (e.g. the MAC address of the residential gateway). When recognizing a message from a known connection (i.e. from the residential gateway 50), the access element - especially the FMC proxy node or instance 176 or the FMC access gateway function node or instance 175 — determines all information available for the connection, both for the services and the network conditions. Based on this information, a decision function decides how the messages of this connection should be processed (cf. B) by selecting one FMC access gateway function module out of a plurality of different FMC access gateway function modules 1751, 1752 (i.e. either involving a first FMC access gateway function module 1751 or a second FMC access gateway function module 1752). Furthermore (cf. C), a suitable data module 1753 with the necessary access gateway function characteristic is selected and linked to the connection for specialization purposes. It is preferred according to the present invention that, in order to support the transition between different data modules, the exchange of an optional token information 176' with the specific residential gateway 50 is performed. This temporary token is managed by the broadband access network 120, especially within the central office point of delivery 110.

Figure 5:
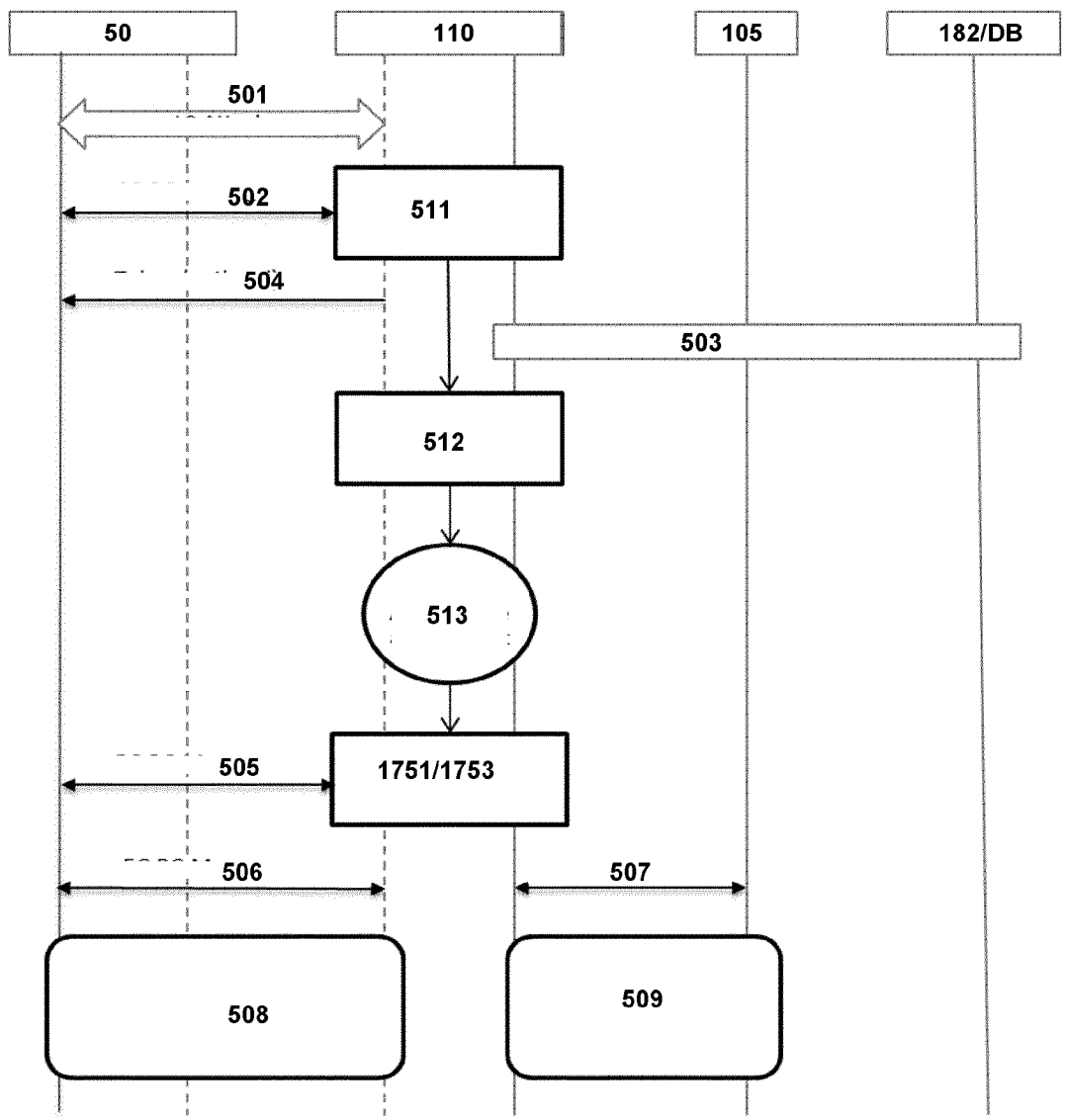
FIGS. 5 and 7 schematically show communication diagrams according to the present invention relating to a network attachment process.

In FIG. 5, a communication diagram according to the present invention for a 5G enabled residential gateway is schematically shown between the specific residential gateway 50, the central office point of delivery 110, the 5G core 105, and the repository node 182 or another database DB.

In a processing step 501, an layer 2 attach is performed by the specific residential gateway 50, i.e. as soon as the residential gateway 50 (being a 5G-enabled residential gateway) is connected to the fixed line, data about the connection and the connection parameters (L2 Attach) are exchanged. The collected data is available for the further process. Once the 5G residential gateway connection is detected (processing step 511), in a processing step 502, the mobile-specific properties of this connection are determined in the database 182 or another database DB (Access verification; processing step 503), which are used in the decision function (processing step 512) to set up (commission, processing step 513) the specialized AGF Data Module (a first FMC access gateway function module 1751 (or a second FMC access gateway function module 1752; however, the case of the first first FMC access gateway function module 1751 is represented in FIG. 5), and a suitable data module 1753). This AGF data module (or these AGF data modules) are integrated in the communication process of the 5G residential gateway 50 with the 5G core 105. Due to the knowledge of fixed network and 5G core information, it is possible for these specialized modules to decouple the communication process, namely via processing steps 506 and 508, representing the communication between the residential gateway 50 and the central office point of delivery 110, and via processing steps 507 and 508, representing the communication between the central office point of delivery 110 and the 5G core 105. This means that not every request from a network direction has to be evaluated, translated and forwarded in detail if the possible answer is already known based on the existing network and environment information (e.g. exchange of location information). Predefined templates with connection and network information can be used for the structure of NAS messages (non-access stratum messages). A blockwise execution of the communication is possible due to this decoupling. Preferably, in a processing step 504, a token information is transmitted to the residential gateway 50.

Figure 6:
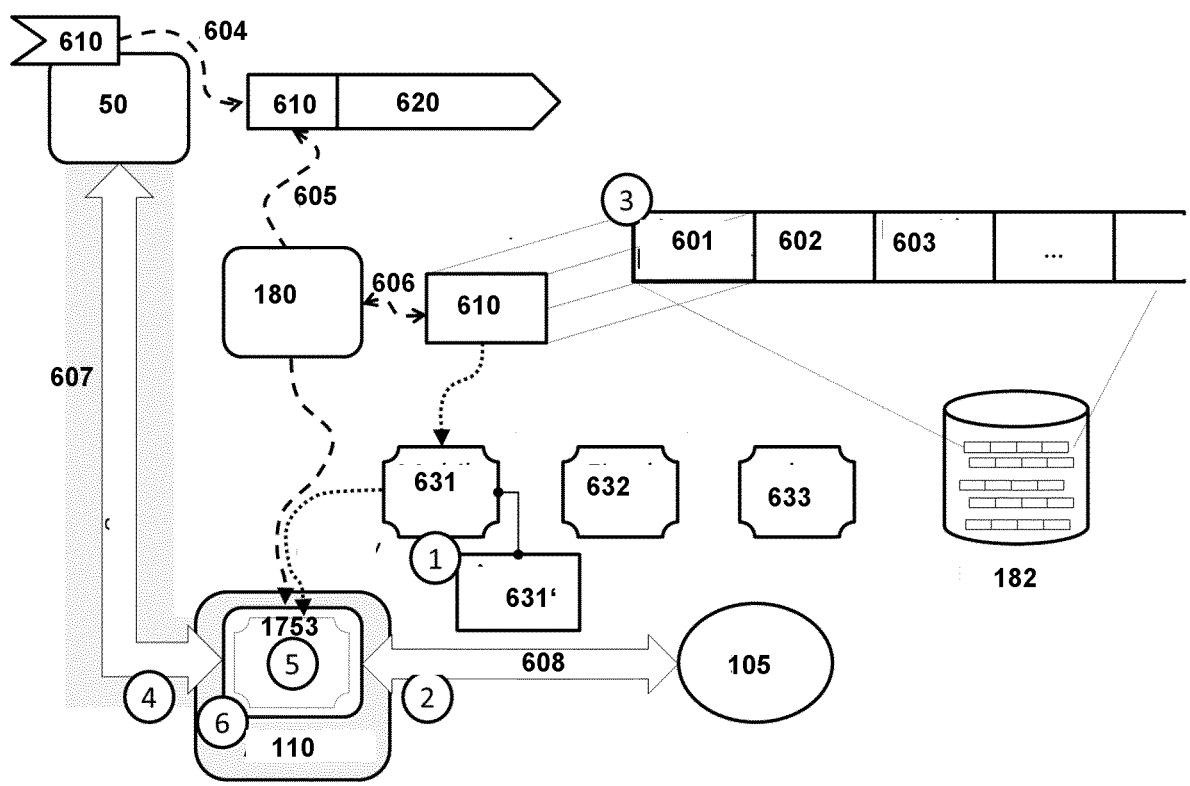

In FIG. 6 a further example of further steps according to the present invention are schematically shown.

A 5G enabled residential gateway 50 is connected via fixed line access to the central office point of delivery 110, cf. reference sign 6. The central office point of delivery 110 has the ability to assign, cf. reference sign 3, the terminal device (i.e. residential gateway 50) to a series of values 601, 602, 603 (such as, e.g., MAC, RAN UE NGAP ID etc.) via a unique identifier 610 and to set up a data module 1753 adapted to this, cf. reference sign 5. This module can be a physical hardware module or a virtual software module or a combination of both. For access by mobile terminals it is a module of the type: "aggregation module". By configuring such a module, it is possible to assign the 5G-residential gateway 50 associated with it to a mobile network 105 (5G core network), an access management function and a demand scheme (cf. reference sign 1, where the unique identifier 610 is set 604, and the access controller node 180 of the central office point of delivery 110 detects 605 the unique identifier 610, and looks up 606 the unique identifier 610, or another of the identifiers 601, 602, 603. By evaluating the fixed network protocols, the central office point of delivery 110 also has precise knowledge of the status of the (fixed network-based) access network up to the end point (5G-residential gateway 50). Thus, a basic position of trust between the fixed network access (central office point of delivery 110) and the access element (residential gateway 50) is already given by the line identification;

the position of trust to the core side (5G core network 105) can be quickly established because the access management function is predetermined in the fixed network application case;

direct trust-based negotiation between the residential gateway 50 (5G enabled residential gateway or 5G user equipment) and the access management function is possible via a connection established without the intervention of the central office point of delivery 110. An image 631, e.g. related to mobile service, out of a plurality of images and configurations 631, 632, 633 (e.g. being related to fixed service) is provided, as well as the corresponding access features 631', and deployed in the central office point of delivery 110. As a consequence, messages (such as 5G core messages 620) are able to be exchanged between the central office point of delivery 110 and the 5G core 105 (cf. reference sign 2; messages 608) and between the residential gateway 50 and the central office point of delivery 110 (cf. reference sign 4; messages 607).

Figure 7:
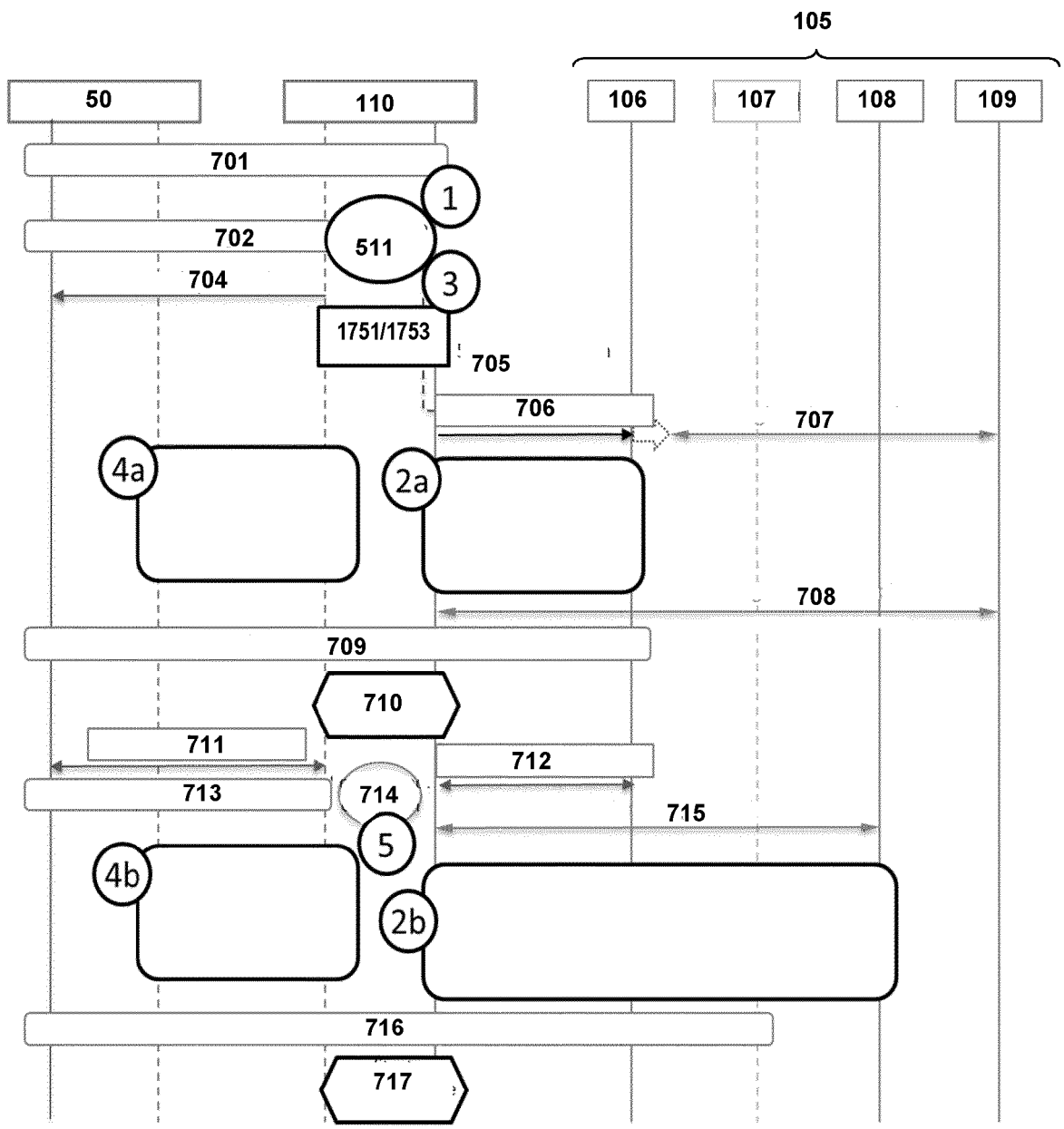

In FIG. 7 a communication diagram according to the present invention for a 5G enabled residential gateway 50 is schematically shown between the specific residential gateway 50, the central office point of delivery 110, the 5G core 105 with its components access (and mobility) management function, AMF 106, user plane function, UPF 107 and/or data network, DN, session management function, SMF 108, and unified data management or user data management, UDM 109.

In a processing step 701, a fixed connection establishment is performed by the specific residential gateway 50, involving the transmission of 5G (residential gateway) messages 702, and a traffic type detection corresponding to processing step 511 (also shown in FIG. 5), as well as the definition (or selection) of an FMC access gateway function module 1751 and/or suitable data module 1753. Again, optionally, a token information is able to be transmitted to the residential gateway 50 in a processing step 704. In processing step 705, a 5G authentication to a preselected access and mobility management function 106 takes place, involving a number of blockbased N-messages, and resulting in or triggering certain 5G registration procedures 707.

In the following, a block-based processing 4a, 2a is realized regarding 5G network attach(ment) and AMF selection (wherein the access and mobility management function 106 used is a predefined (and statically) "selected" AMF entity or instance), i.e. the exchange of a certain number of messages, or N-messages, resulting, eventually, in a communication between the residential gateway 50 and the 5G core (network) 105 (or, more specifically, the access and mobility management function 106 of the 5G core 105), wherein this resulting communication is split into a first communication branch, or leg, between, on the one hand, the residential gateway 50, and the central office point of delivery 110, on the other hand, (block-based processing 4a), and a second communication branch, or leg, between, on the one hand, the 5G core (network) 105, and the central office point of delivery 110, on the other hand (block-based processing 2a).

After this block-based processing 4a, 2a (i.e. after processing step 708, relating to 5G registration acceptance), at the indication 709, the mobile registration (or, rather, the registration of the specific residential gateway 50 with the 5G core (network) 105) is finished; and a detection, or monitoring (in processing step 710) regarding registration changes is able to be conducted.

In the next phase or processing step, a selection of the session management function 108 to be used and of the user plane function 107 to be used takes place: In a processing step 711, a number of block-based N-messages are exchanged, as well as in a processing step 712. A session request 713 is transmitted, by the residential gateway 50 to the central office point of delivery 110, and a session request detection (processing step 714), as well as 5G session setup procedures 715 performed.

In the following, a block-based processing 4b, 2b is realized regarding session establishment and/or SMF/UPF selection (or definition), i.e. the exchange of a certain number of messages, or N-messages, resulting, eventually, again in a communication between the residential gateway 50 and the 5G core (network) 105 (or, more specifically, the session management function 108 of the 5G core network 105), wherein this resulting communication is split into a first communication branch, or leg, between, on the one hand, the residential gateway 50, and the central office point of delivery 110, on the other hand, (block-based processing 4b), and a second communication branch, or leg, between, on the one hand, the 5G core (network) 105, and the central office point of delivery 110, on the other hand (block-based processing 2b).

As a result, the PDU session is established (processing step 716), and a detection, or monitoring (in processing step 717) regarding session changes is able to be conducted. The method hereby presented comprises (especially in communication blocks 2a, 4a, 2b, and 4b) the blockwise, decoupled execution of the registration procedures (blocks 2a and 4a) based on information acquired outside the registration process. The N-messages are not evaluated in detail, but are answered with ready-made values without involving the other side. The respective counterparty is "emulated" with the help of the central information. The N1 message in the direction of the 5G core 105 is emulated and it is exchanged in the N1 exchange at 4a in the direction of 5G residential gateway 50 so that the residential gateway 50 sees (or is emulated) the 5G core anchorage; this is emulated in the central office point of delivery 110, especially using pre-configured or pre-filled-in template messages for the NAS-communication.

The registration ends with the exchange of the "Registration Accept" or "Registration Complete" as described in 3GPP TS 23.502 Chap. 4.2.2.2.2. The central knowledge of access-specific (fixed and mobile) profiles makes it easier to negotiate session parameters. This is because: If the parameters of the fixed network connection are within the SLA (service level agreement) framework agreed for, known fixed network connection profiles regulate the maximum possible use of the connection. Higher values cannot (should not) be achieved. If the fixed network capacity is sufficient, the mobile service profiles limit the use of the access. Optionally, the network bandwidth N1 and N2 resulting from the FN regulation can also be made available in blocks, analogous to the signalling of the currently usable RAN bandwidth in N1 and N2 that is common in mobile radio.

In other words, current measurement values would have to be passed on; these are no longer just fixed, preconfigured information units. Mapping and weighing of capacities and service requirements is possible due to the knowledge of all profiles. As soon as the request for a session setup (session request) is detected during a connection, the environments (context) for the session can be set up. The session setup procedures (2b and 4b) can be decoupled and executed block by block without taking into account detailed information from the N messages, as in the case of registration. The N messages are not evaluated in detail but are answered with predefined values without involving the other side. The respective opposite side is "emulated" with the help of the central information, and using pre-configured or pre-filled-in template messages for the NAS-communication.

Hence, according to the present invention, during the implementation of the aggregation module (FMC access gateway function 175) for the central office point of delivery 110, configuration procedures are processed schematically. Thus, a detailed evaluation of configuration messages in the module can be omitted.

The central office point of delivery 110 (and/or the FMC access gateway function node or instance 175) evaluates the data stream from the access network of fixed network or 5G lines and identifies the mobile radio traffic based on previously recorded connection and access element information (e.g. Port ID, Ser.No., MAC, Line ID, SUCI, etc.). Furthermore, the central office point of delivery 110 evaluates the data stream from the access network of fixed network or 5G lines and recognizes mobile radio traffic based on the unique identifier 610.

The central office point of delivery 110 (and/or the FMC access gateway function node or instance 175) evaluates the data stream from the access network of fixed network or 5G lines and detects the mobile traffic via a service feature in the protocol used. The central office point of delivery 110 (and/or the FMC access gateway function node or instance 175) decides on the installation of a suitable aggregation module based on determined and combined data of the FMC access.

The central office point of delivery 110 (and/or the FMC access gateway function node or instance 175) sets up an individualized aggregation module based on access-specific data (e.g. hardware information, unique ID, parameterization) and information that can be determined from an allocation table. The central office point of delivery 110 (and/or the FMC access gateway function node or instance 175) has knowledge of the end point, core elements and connection profiles and makes them available for the aggregation module (within the central office point of delivery 110), and the aggregation module performs a blockwise registration with emulation of the respective counterpart. The aggregation module carries out a blockwise service setup with emulation of the respective opposite side, and the central office point of delivery 110 (and/or the FMC access gateway function node or instance 175) especially uses a token for the connection transition between specialized modules.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for an operation and for architecture of a broadband access network, comprising a central office point of delivery, of a telecommunications network and/or for providing fixed mobile convergence (FMC) and/or fixed mobile interworking (FMI) access and functionality to a plurality of residential gateways being connected to the broadband access network,
wherein the broadband access network comprises an FMC access gateway function node or instance,
wherein the central office point of delivery and/or the broadband access network comprises a plurality of line termination nodes, wherein a specific residential gateway of the plurality of residential gateways is connectable, directly or indirectly, to a specific line termination node of the plurality of line termination nodes, using an access node port of the specific line termination node,
wherein, upon activation of the specific residential gateway being connected to the specific line termination node, the FMC access and functionality is set up or provided to the specific residential gateway by means of the following steps:
in a first step, a unique identifier information is transmitted, by the specific residential gateway and as part of a port notification message, to the broadband access network and/or to the central office point of delivery,
in a second step, subsequent to the first step, the unique identifier information transmitted by the specific residential gateway is used, by the broadband access network and/or by the central office point of delivery, to decide
whether or not the broadband access network is able or configured to provide 5G network access to the specific residential gateway at the location of the specific residential gateway, and/or
whether the specific residential gateway is able or configured to receive or to accept or to process 5G network access in case the broadband access network is able or configured to provide 5G network access,
in a third step, subsequent to the second step, the FMC access gateway function node or instance is dynamically configured or generated in order to provide network access to the specific residential gateway according to both the configuration or ability of the specific residential gateway, and the configuration or ability of the broadband access network at the location of the specific residential gateway;
wherein the central office point of delivery and/or the broadband access network comprises an FMC proxy node or instance as part of the FMC access gateway function node or instance, wherein the FMC proxy node or instance
detects, as part of the second step and by means of or based on the unique identifier information transmitted by the specific residential gateway, which protocols and procedures shall be used with respect to the specific residential gateway, and
determines, as part of the third step and by means of selecting one FMC access gateway function module out of a plurality of different FMC access gateway function modules, as well as by means of selecting a corresponding FMC access gateway function data module or feature block, how access-related messages shall be processed.

2. The method according to claim 1, wherein the central office point of delivery and/or the broadband access network comprises or is assigned to or is able to access a controller node, and at least one repository node, wherein the controller node and/or the at least one repository node or database content of the at least one repository node is or are involved in the decision of the second step,
wherein the second step involves a first look up operation in order to determine or to decide whether or not the broadband access network is able or configured to provide 5G network access to the specific residential gateway, at the location of the specific residential gateway, and/or wherein the second step involves a second look up operation in order to determine or to decide whether the specific residential gateway is able or configured to receive or to accept or to process 5G network access.

3. The method according to claim 1, wherein the central office point of delivery and/or the broadband access network comprises or is assigned to a 5G core network wherein, subsequent to selecting the FMC access gateway function module and the corresponding FMC access gateway function data module or feature block, a block-based processing is realized, on the one hand, between the specific residential gateway and the central office point of delivery, and, on the other hand, the central office point of delivery and the 5G core network.

4. The method according to claim 1, wherein, as part of the second step and after an initial access verification, a token information is transmitted, by the broadband access network and/or by the central office point of delivery, to the specific residential gateway, wherein the token information corresponds to a central token information being known to different network nodes or instances of the broadband access network and/or the central office point of delivery and is used as an identifier during subsequent steps or processes.

5. The method according to claim 1, wherein the broadband access network or the central office point of delivery comprises a plurality of service edge nodes, and/or wherein the specific line termination node is connected or is connectable to the specific residential gateway by means of a specific network termination node of a plurality of network termination nodes.

6. The method according to claim 1, wherein subsequent to completing a registration procedure of the specific residential gateway, a protocol data unit (PDU) session is established by performing a further block-based processing, on the one hand, between the specific residential gateway and the central office point of delivery, and, on the other hand, the central office point of delivery and the 5G core.

7. A telecommunications network for an operation and for an architecture of a broadband access network, and/or for providing fixed mobile convergence (FMC) and/or fixed mobile interworking (FMI) access and functionality to a plurality of residential gateways being connected to the broadband access network, comprising:

the broadband access network, a central office point of delivery of the telecommunications network, and the plurality of residential gateways, wherein the broadband access network comprises an FMC access gateway function node or instance, wherein the central office point of delivery and/or the broadband access network comprises a plurality of line termination nodes, wherein a specific residential gateway of the plurality of residential gateways is connectable, directly or indirectly, to a specific line termination node of the plurality of line termination nodes, using an access node port of the specific line termination node, wherein, upon activation of the specific residential gateway being connected to the specific line termination node, the FMC access and functionality is set up or provided to the specific residential gateway and the telecommunications network is configured such that:

a unique identifier information is received, by the broadband access network and/or by the central office point of delivery from the specific residential gateway and as part of a port notification message, the unique identifier information received from the specific residential gateway is used, by the broadband access network and/or by the central office point of delivery, to decide whether or not the broadband access network is able or configured to provide 5G network access to the specific residential gateway at the location of the specific residential gateway, and/or whether the specific residential gateway is able or configured to receive or to accept or to process 5G network access, in case the broadband access network is able or configured to provide 5G network access, the FMC access gateway function node or instance is dynamically configured or generated in order to provide network access to the specific residential gateway according to both the configuration or ability of the specific residential gateway, and the configuration or ability of the broadband access network, at the location of the specific residential gateway, wherein the central office point of delivery and/or the broadband access network comprises an FMC proxy node or instance as part of the FMC access gateway function node or instance, wherein the FMC proxy node or instance:

detects, by means of or based on the unique identifier information transmitted by the specific residential gateway, which protocols and procedures shall be used with respect to the specific residential gateway, and determines, by means of selecting one FMC access gateway function module out of a plurality of different FMC access gateway function modules, as well as by means of selecting a corresponding FMC access gateway function data module or feature block, how access-related messages shall be processed.

8. A non-transitory storage medium storing a computer program for an operation and for an architecture of a broadband access network, comprising a central office point of delivery, of a telecommunications network and/or for providing fixed mobile convergence (FMC) and/or fixed mobile interworking (FMI) access and functionality to a plurality of residential gateways being connected to the broadband access network, the computer program comprising program code which, when executed on a computer and/or on a central office point of delivery and/or on a FMC access gateway function node or instance of a central office point of delivery, or in part on a central office point of delivery and/or in part on a FMC access gateway function node or instance of the central office point of delivery, causes the computer and/or the central office point of delivery and/or the FMC access gateway function node or instance of the central office point of delivery to perform the method according to claim 1.

* * * * *